(12) United States Patent
Jiang et al.

(10) Patent No.: US 8,249,084 B2
(45) Date of Patent: Aug. 21, 2012

(54) RING CONNECTION CONTROL CIRCUIT, RING SWITCHING HUB, RING ETHERNET SYSTEM, AND RING CONNECTION CONTROLLING METHOD

(75) Inventors: Wei Jiang, Tokyo (JP); Atsushi Seita, Tokyo (JP)

(73) Assignee: AZBIL Corporation, Tokyo (JP)

( * ) Notice: Subject to any disclaimer, the term of this patent is extended or adjusted under 35 U.S.C. 154(b) by 306 days.

(21) Appl. No.: 12/604,869

(22) Filed: Oct. 23, 2009

(65) Prior Publication Data

US 2010/0111092 A1 May 6, 2010

(30) Foreign Application Priority Data

Oct. 30, 2008 (JP) ................................. 2008-279362

(51) Int. Cl.
*H04L 12/56* (2006.01)

(52) U.S. Cl. ......... 370/400; 370/401; 370/403; 370/466

(58) Field of Classification Search .................. 370/242, 370/466, 401, 403
See application file for complete search history.

(56) References Cited

U.S. PATENT DOCUMENTS 6,304,575 B1  10/2001  Carroll et al.
2002/0176373 A1  11/2002  Sato
2005/0129059 A1*  6/2005  Jiang et al. ..................... 370/466
2006/0182036 A1*  8/2006  Sasagawa et al. ............. 370/242
2006/0215546 A1  9/2006  Tochio
2006/0250969 A1*  11/2006  Florit et al. ..................... 370/241
2010/0284413 A1*  11/2010  Abdullah et al. .............. 370/401

FOREIGN PATENT DOCUMENTS

JP   2006-174422 A   6/2006

OTHER PUBLICATIONS

1 Shah, S. & Yip, M.; Extreme Networks: Ethernet Automatic Protection Switching (EAPS), Version 1; draft-shah-extreme-eaps-00.txt, IETF Standard-Working-Draft, Internet Engine Task Force, IETF, CH, Dec. 11, 2002, XP015035157 ISSN: 0000-0004.

* cited by examiner

*Primary Examiner* — Dang Ton
*Assistant Examiner* — Mohamed Kamara
(74) *Attorney, Agent, or Firm* — McDermott Will & Emery LLP

(57) ABSTRACT

If either of the MAC processing units in one of the ring connection control circuits receives a MAC frame that includes control information for the redundancy control process related to one of the subrings from that subring, then output of the relevant MAC frame to the transfer processing unit is restricted and the relevant MAC frame is output to the STP processing unit.

5 Claims, 6 Drawing Sheets

RING CONNECTION CONTROL CIRCUIT, RING SWITCHING HUB, RING ETHERNET SYSTEM, AND RING CONNECTION CONTROLLING METHOD

CROSS REFERENCE TO RELATED APPLICATION

The present application claims priority under U.S.C. §119 to Japanese Patent Application No. 2008-279362, filed Oct. 30, 2008. The content of the application is incorporated herein by reference in its entirety.

FIELD OF THE INVENTION

The present invention relates to an Ethernet® communication technology and more particularly relates to a ring Ethernet communication technology wherein a plurality of sub-rings is used.

BACKGROUND OF THE INVENTION

In a monitoring and controlling system that monitors and controls, for example, a building facility or a plant facility, communication devices, which have various functions such as information collection functions and control functions, are connected as nodes via a communication network, and a central monitoring device separately monitors and controls each facility based on information sent from the nodes. Such a monitoring and controlling system uses Ethernet as the communication network.

When using Ethernet, multiple nodes are fundamentally connected in a star configuration, wherein each node is connected to a hub, a switch, or the like. Although a star configuration is suited to relatively small scale office environments, it is not necessarily suited to large scale facilities, such as building facilities or plant facilities. This is because, in a star configuration, each node must be connected to a hub or a switch via separate wiring, and, if the nodes are installed over a wide area, the wiring that connects these nodes becomes complicated, which in turn increases the workload involved with the wiring work and maintenance.

An Ethernet switch that connects each node via Ethernet using a ring configuration has been proposed. This ring Ethernet switch is a relay device that connects multiple nodes in a ring via bridge wiring using network control functions such as a spanning tree protocol (STP; Spanning Tree Protocol/IEEE 802.1D), which resolves communication errors generated by a ring topology that exist in a communication path, and rapid STP (RSTP; Rapid STP/IEEE 802.1w), which improves on STP. Providing a ring Ethernet switch for each node makes it possible to connect multiple nodes in a ring configuration and to achieve system redundancy.

FIG. 7 is an example of a configuration of a typical ring Ethernet system. Here, multiple nodes N are connected to a ring L via ring Ethernet switches. Normally, the network control function, such as RSTP or STP, installed in each Ethernet switch selects one root node R from among the nodes connected in a ring, network control information in the form of so-called bridge protocol data units (BPDUs) is exchanged between the root node R and the other nodes, and thereby an active communication path configured in a tree topology is established based on the node-to-node ring costs.

At this time, ports of nodes in unnecessary paths, which are those paths other than the active communication path, are blocked and established as backup communication paths in the event of a failure.

In the example shown in FIG. 7, the path from the root node R to a node N1 could be either counterclockwise or clockwise. If the cost of the counterclockwise direction is lower than that of the clockwise direction at this time, then the counterclockwise path will be selected as the active communication path. Accordingly, the path from the node N1 to a node N2 becomes an unnecessary path, and it is blocked at either one of its end points, namely the node N1 or the node N2. Consequently, the original ring L configured in a ring topology is modified to a tree topology that comprises two branch paths, one from the root node R to the node N1 and one from the root node R to the node N2.

Thereby, even in a network that is physically configured in a ring topology, the generation of data loops is avoided. In addition, if any of the nodes becomes unable to receive the BPDUs transmitted periodically from the root node R, then it can be determined that a failure has occurred in the path between the root node R and the relevant node. In such a case, a restructure request is transmitted from the relevant node to the root node R in the reverse direction. In response to receiving this restructure request, blocked nodes are unblocked. Thereby, a new communication path is constructed using the backup communication path that was being blocked.

Accordingly, in the example shown in FIG. 7, if a failure occurs at a point P, a restructure request is sent from a node N3, the node N1 unblocks a point B, and thereby a new path is constructed from the root node R to the node N3.

If a large scale Ethernet network with a single ring is implemented in, for example, a building facility or a plant facility using ring Ethernet switches, then, because all of the nodes share a single ring, the reliability of the system as a whole decreases.

As an example of technology to solve such problems in the conventional art, a method (e.g., refer to Japanese Unexamined Patent Application Publication No. 2006-174422 and the like) has been proposed wherein the nodes are divided into multiple subrings and connected, and the subrings are connected to one another using general-purpose switching hubs. Thereby, risk is distributed among the subrings, which improves system reliability.
1

In this conventional art, physically independent subrings are connected by general-purpose switching hubs, which makes it possible to communicate between the subrings not only user data but also network control data. Namely, one domain is formed not only for data communication but also for network control.

Accordingly, in the conventional art, when a failure that occurs in an arbitrary subring propagates to another subring, the network control function performs an operation that restructures the communication path even in the normal subring; consequently, data communication to and from the nodes connected to the normal subring is temporarily inhibited, which is a problem.

FIG. 8 is an example of the configuration of a ring Ethernet network according to the conventional art. Here, the network comprises three subrings L1-L3, each of which is connected to a switching hub. The switching hub has a function that corresponds to the network control function (e.g., RSTP or STP) installed in each node and transfers BPDUs and restructure requests used in the network control function among the subrings L1-L3.

Thereby, from the standpoint of the network control function, the three subrings L1-L3 are regarded as one ring, wherein BPDUs transmitted from the root node R of the subring L1 are also transferred to the other subrings L2, L3.

Here, if a failure occurs at, for example, the point P in the subring L1, then a restructure request is transmitted from the node N3 to the node N2, and the point B between the node N1 and the node N2 is unblocked. Thereby, a new communication path is constructed from the root node R to the node N1 by using the backup communication path, which was being blocked, between the node N1 and the node N2.

To construct a new communication path, a restructuring operation is performed at this time even in the nodes connected to the subrings L2, L3, which are subrings other than the subring L1 at which the failure occurred, and consequently data communication to and from the nodes connected to the normal subrings is temporarily impeded.

The present invention was conceived to solve these problems, and it is an object of the present invention to provide a ring connection control circuit, a ring Ethernet switch, a ring Ethernet system, and a ring connection controlling method that can maintain data communication with a normal subring even if a failure occurs in an arbitrary subring.

SUMMARY OF THE INVENTION

To achieve this object, a ring connection control circuit according to one aspect of the present invention is a ring connection control circuit that connects a subring, wherein a plurality of communication devices is connected in series in a ring, and a switching hub, and includes: a first MAC processing unit, which is connected to one end of the subring and sends and receives MAC frames to and from the communication devices; a second MAC processing unit, which is connected to the other end of the subring and sends and receives MAC frames to and from the communication devices; an STP processing unit, which is connected to the first and second MAC processing units and performs a redundancy control process on the subring based on a spanning tree protocol; a third MAC processing unit, which is connected to the switching hub and sends and receives MAC frames; and a transfer processing unit, which transfers MAC frames received by the first MAC processing unit, the second MAC processing unit, and the third MAC processing unit to any one processing unit from the group consisting of the first MAC processing unit, the second MAC processing unit, and the third MAC processing unit based on destination information that is included in the relevant MAC frame; wherein, if the first and second MAC processing units receive from the subring a MAC frame that includes control information for the redundancy control process related to that subring, then output of the relevant MAC frame to the transfer processing unit is restricted and the MAC frame is output to the STP processing unit.

In addition, a ring switching hub according to another aspect of the present invention is a ring switching hub that has: a plurality of ring connection control circuits discussed above that connects separate subrings, which each comprise a plurality of communication devices connected in series in a ring; and a switch unit, which connects the ring connection control circuits and a third MAC processing unit and transfers MAC frames received by these ring connection control circuits from their respective subrings to one of the ring connection control circuits based on destination information that is included in the relevant MAC frame.

In addition, a ring Ethernet system according to another aspect of the present invention is a ring Ethernet system that uses a plurality of subrings, each of which includes a plurality of communication devices connected in series in a ring, to implement Ethernet communication between the communication devices, and has: a plurality of the ring switching hubs discussed above that connect the separate subrings, each of which comprises the plurality of communication devices connected in series in a ring; and one main ring that connects these ring switching hubs in a ring.

In addition, a ring Ethernet system according to another aspect of the present invention is a ring Ethernet system that uses a plurality of subrings, each of which includes a plurality of communication devices connected in a ring, to implement Ethernet communication between the communication devices, and has: a plurality of the ring switching hubs discussed above that connect the separate subrings, each of which comprises the plurality of communication devices connected in a ring; and a switching hub, which is connected to each of these ring switching hubs and exchanges MAC frames received by these ring switching hubs from their respective subrings.

In addition, a ring connection controlling method according to another aspect of the present invention is a ring connection controlling method that connects a subring, wherein a plurality of communication devices is connected in a ring, and a switching hub, and has: a first MAC processing step, wherein a first MAC processing unit sends and receives MAC frames to and from the communication devices via one end of the subring; a second MAC processing step, wherein a second MAC processing unit sends and receives MAC frames to and from the communication devices via the other end of the subring; an STP processing step, wherein an STP processing unit is connected to the first and second MAC processing units and performs a redundancy control process on the subring based on a spanning tree protocol; a third MAC processing step, wherein a third MAC processing unit sends and receives MAC frames to and from the switching hub; and a transfer processing step, wherein a transfer processing unit exchanges MAC frames from the subrings received by the first and second MAC processing units and MAC frames from the subrings received by the third MAC processing unit; wherein, if the first and second MAC processing steps receive from the subring a MAC frame that includes control information for the redundancy control process related to that subring, then output of the relevant MAC frame to the transfer processing unit is restricted and the MAC frame is output to the STP processing unit.

According to the ring connection control circuit of the present invention, it is possible to prevent the redundancy control process performed at a subring from affecting other subrings that are connected via the switch unit. Consequently, even if a failure occurs at an arbitrary subring, data communication can be maintained at normal subrings.

In addition, according to the ring switching hub of the present invention, a ring Ethernet system can be constructed using a plurality of subrings that perform separate redundancy control processes independent of one another, which improves the availability of Ethernet networks. In addition, the number of rings is not limited, and a large scale ring Ethernet network can be constructed extremely easily. In addition, providing the general port for non-ring connection to the switch unit makes it possible to connect commercially available Ethernet connectible devices such as personal computers and servers, which provides flexibility when constructing an Ethernet network.

In addition, according to the ring Ethernet system of the present invention, it is possible to construct both a data communication environment and a monitoring and controlling system that possess high reliability even in a large scale facility, such as a building facility or a plant facility, that spans a large area.

DETAILED DESCRIPTION OF THE PREFERRED EMBODIMENTS

The following text explains embodiments of the present invention, referencing the drawings.

Figure 1:
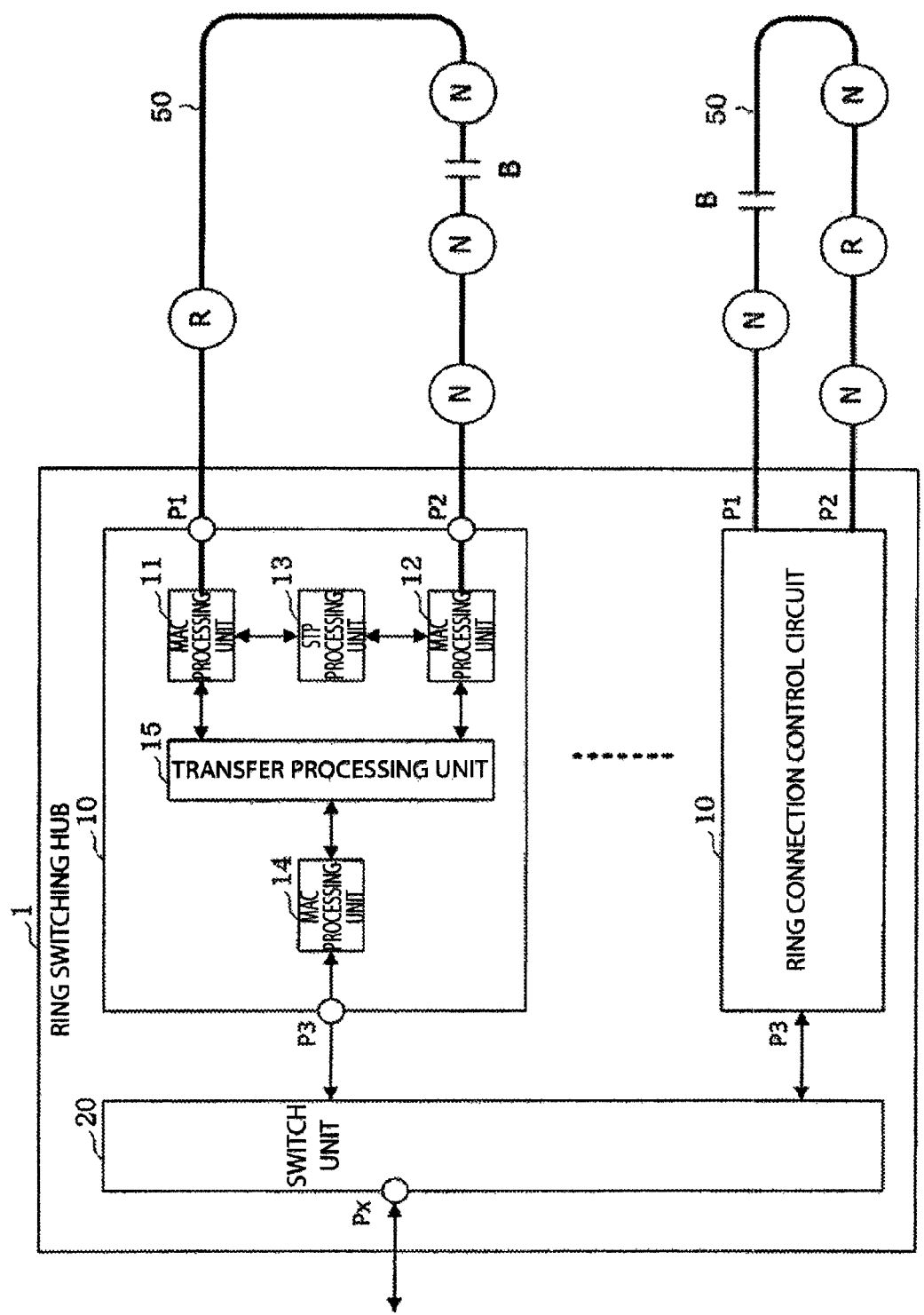
FIG. 1 is a block diagram that shows the configuration of ring connection control circuits and a ring switching hub according to an embodiment of the present invention.

First, a ring connection control circuit according to an embodiment of the present invention will be explained, referencing FIG. 1. FIG. 1 is a block diagram that shows the configuration of a ring connection control circuit and a ring switching hub according to the embodiment of the present invention.

Configuration of Ring Connection Control Circuit

Each of a plurality of ring connection control circuits 10 include electronic circuits, which are formed on a semiconductor chip, and has a connection control function that is used when connecting subrings 50, each of which connects a plurality of communication devices (R, N) in series in a ring, to a switching hub.

The principal processing units provided to each of the ring connection control circuits 10 are a MAC processing unit 11 (i.e., a first MAC processing unit), a MAC processing unit 12 (i.e., a second MAC processing unit), an STP processing unit 13, a MAC processing unit 14 (i.e., a third MAC processing unit), and a transfer processing unit 15.

The MAC processing unit 11 connects to one end of one of the subrings 50 via a port P1 for ring connection and comprises: a function that sends and receives MAC frames to and from the communication devices (R, N); a function that, if a MAC frame that includes control information for a redundancy control process related to one of the subrings 50 is received from that subring 50, restricts the output of that MAC frame to the transfer processing unit 15; and a function that outputs to the STP processing unit 13 MAC frames that include control information for the redundancy control process.

The MAC processing unit 12 connects to the other end of one of the subrings 50 via a port P2 for ring connection and comprises: a function that sends and receives MAC frames to and from the communication devices (R, N); a function that, if a MAC frame that includes control information for a redundancy control process related to one of the subrings 50 is received from that subring 50, restricts the output of that MAC frame to the transfer processing unit 15; and a function that outputs to the STP processing unit 13 MAC frames that include control information for the redundancy control process.

Figure 7:
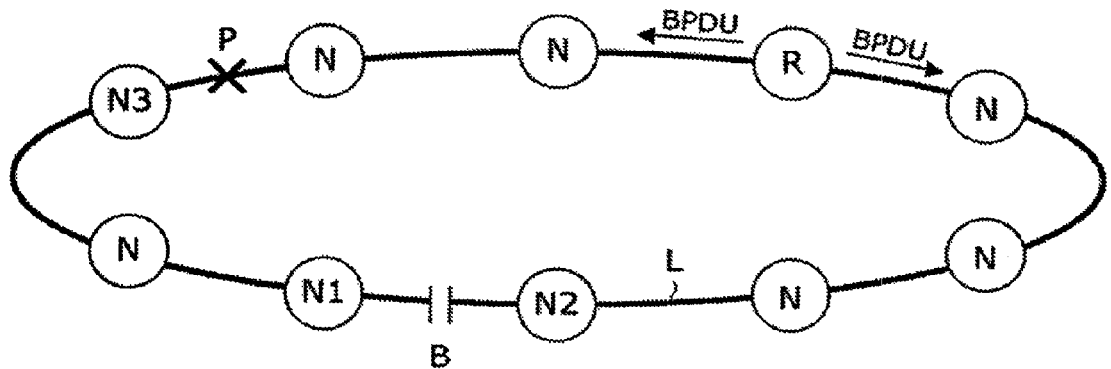
FIG. 7 is an example of the configuration of a typical ring Ethernet system.
Figure 8:
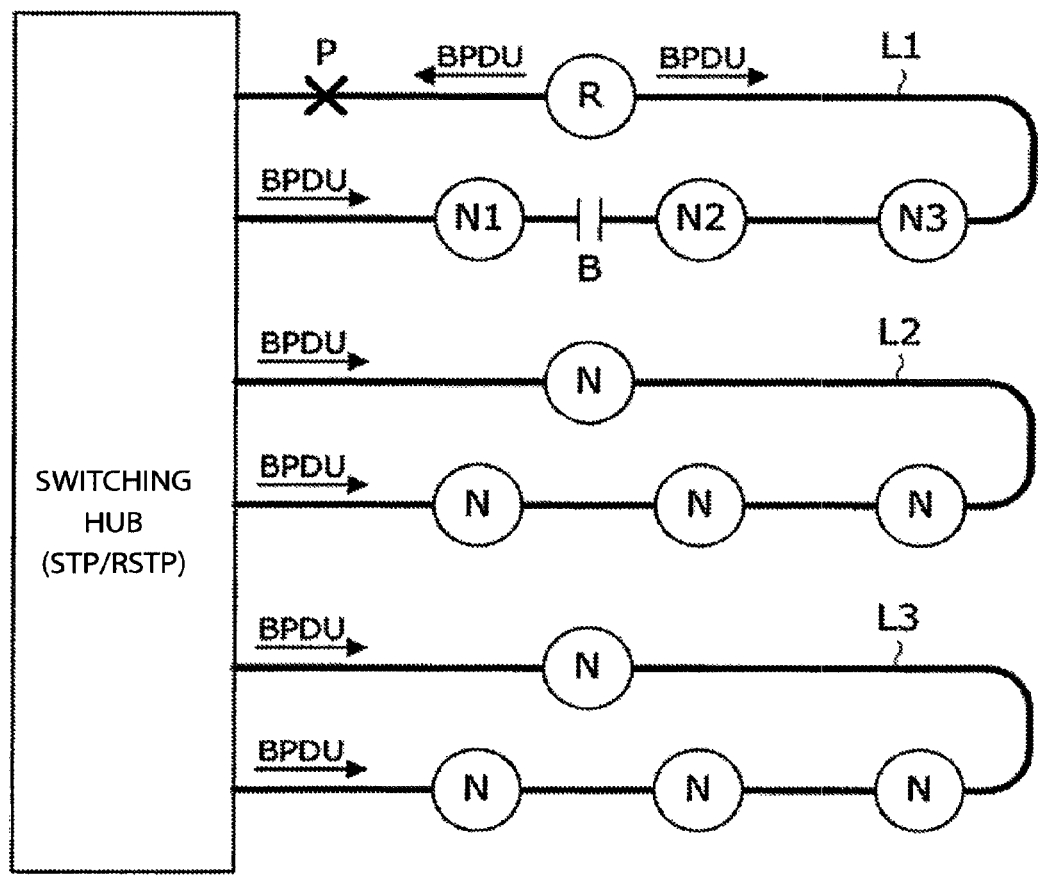
FIG. 8 is an example of the configuration of a ring Ethernet network according to the conventional art.

The STP processing unit 13 is connected to each of the MAC processing units 11, 12, and comprises a function that, based on the spanning tree protocol (STP) or rapid STP (RSTP), performs the redundancy control process on the relevant subring 50. This redundancy control process includes the process of establishing the active communication path, the process of switching to a backup communication path by unblocking it in response to a failure in the active communication path, and the like, each of which was explained in FIG. 7 discussed above.

The MAC processing unit 14 is connected to the port P3 for non-ring connection and has a function that sends and receives MAC frames.

The transfer processing unit 15 has a function that transfers the MAC frames received by each of the MAC processing units 11, 12, 14 to just one of these MAC processing units 11, 12, 14 based on the destination information included in each of the MAC frames.

Configuration of Ring Switching Hub

The ring switching hub according to an embodiment of the present invention will now be explained, referencing FIG. 1.

A ring switching hub 1 is a communication device that has functions that interconnect a plurality of subrings 50; the ring switching hub 1 is provided with, as its principal functional units, the plurality of ring connection control circuits 10 and a switch unit 20.

The switch unit 20 is connected to the MAC processing unit 14 of each of the ring connection control circuits 10 and has a function that transfers MAC frames received by these ring connection control circuits 10 from their respective subrings 50 to one of the ring connection control circuits 10 based on the destination information included in the each of the MAC frames. In addition, a general port Px for non-ring connection is provided.

Operation of the Embodiment

Figure 2:
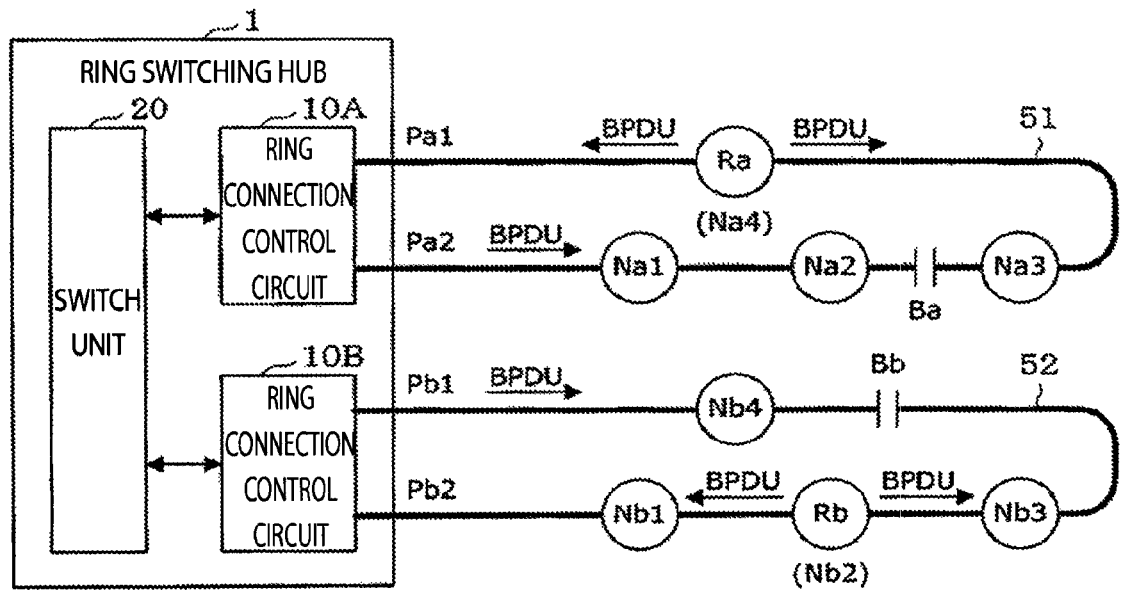
FIG. 2 is an explanatory diagram that shows the configuration of subrings before a failure occurs.
Figure 3:
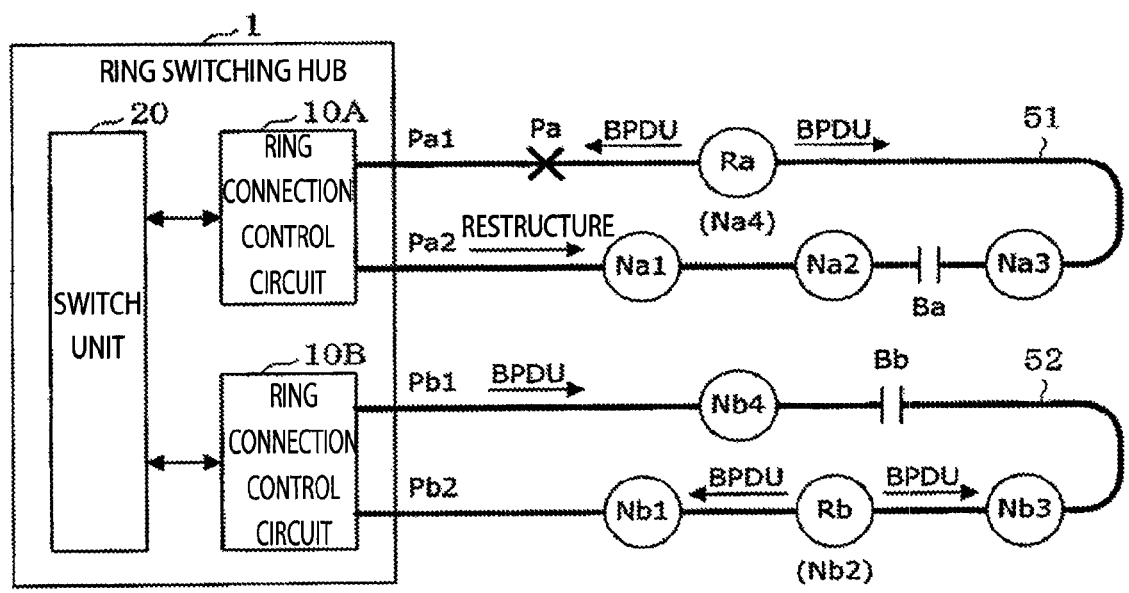
FIG. 3 is an explanatory diagram that shows the configuration of subrings during a failure.
Figure 4:
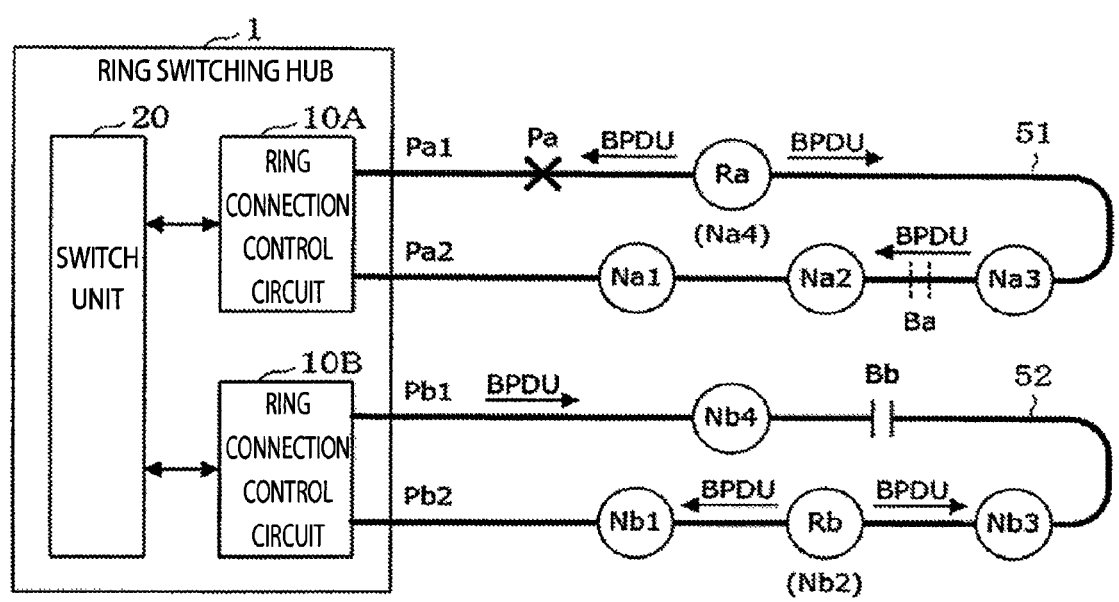
FIG. 4 is an explanatory diagram that shows the configuration of subrings after a failure has occurred.

Next, the operation of the ring connection control circuits 10 and the ring switching hub 1 according to of the present invention will be explained, referencing FIG. 2 through FIG. 4. FIG. 2 is an explanatory diagram that shows the configuration of subrings before a failure occurs. FIG. 3 is an explanatory diagram that shows the configuration of subrings during a failure. FIG. 4 is an explanatory diagram that shows the configuration of subrings after a failure has occurred.

In FIG. 2, the ring switching hub 1 comprises two ring connection control circuits 10A, 10B; in addition, a subring 51 is connected to the ring connection control circuit 10A, and a subring 52 is connected to the ring connection control circuit 10B.

One end of the subring 51 is connected to a port Pa1 (P1) of the ring connection control circuit 10A, and the other end of the subring 51 is connected to a port Pa2 (P2) of the ring connection control circuit 10A. In addition, one end of the subring 52 is connected to a port Pb1 (P1) of the ring connection control circuit 10B, and the other end of the subring 52 is connected to a port Pb2 (P2) of the ring connection control circuit 10B.

In sequence from the port Pa2 side, nodes Na1, Na2, Na3, Na4 are connected in series in a ring to the subring 51, and a point Ba between the node Na2 and the node Na3 is blocked; moreover, among those nodes Na1, Na2, Na3, Na4, the node Na4 is designated as a root node Ra.

In sequence from the port Pb2 side, nodes Nb1, Nb2, Nb3, Nb4 are connected in series in a ring to the subring 52, and a point Bb between the node Nb3 and the node Nb4 is blocked; moreover, of these nodes Nb1, Nb2, Nb3, Nb4, the node Nb2 is designated as a root node Rb.

These nodes (i.e., communication devices) may be terminal control devices, such as field controllers, I/O modules, and card readers, or they may be communication gateways for coupling with devices based on other communication protocols.

As discussed above, if either of the MAC processing units 11, 12 of the respective ring connection control circuits 10A, 10B receives a MAC frame that includes control information for the redundancy control process related to the corresponding subring 51, 52 from the relevant subring, then the output of that MAC frame to the corresponding transfer processing unit 15 is restricted, and the MAC frame that includes control information for the redundancy control process is output to the corresponding STP processing unit 13.

Consequently, BPDUs transmitted from the root node Ra of the subring 51 are not output to the corresponding transfer processing unit 15 and, furthermore, are not transferred to the subring 52 via the forwardly disposed switch unit 20 and the ring connection control circuit 10B. In addition, BPDUs from the subring 52 are also not transferred to the subring 51.

Thereby, as shown in FIG. 2, the root node Ra and the blocking point Ba are set in the subring 51, and, based on the BPDUs transmitted from the root node Ra, a separate redundancy control process is performed independent of the subring 52. In addition, the root node Rb and the blocking point Bb are set in the subring 52, and, based on the BPDUs transmitted from the root node Rb, a separate redundancy control process is performed independent of the subring 51.

Accordingly, for example, as shown in FIG. 3, if a failure occurs at a point Pa between the port Pa1 and the root node Ra of the subring 51, then the BPDUs from the root node Ra can no longer be received by the STP processing unit 13 of the ring connection control circuit 10A, and consequently a restructure request that calls for the restructuring of the subring 51 is transmitted from the port Pa2 via the MAC processing unit 12, which is on the side opposite that of the root node Ra.

At this time, at the subring 52, where a separate root node Rb has been set, BPDUs are transmitted from this root node Rb to each of the nodes Nb1, Nb2, Nb3 and the ring connection control circuit 10B. Consequently, BPDUs generated as a result of the failure that occurred in the subring 51 can no longer be received; furthermore, the root node Rb and the nodes Nb1, Nb3, Nb4 of the subring 52 as well as the ring connection control circuit 10B are not affected by the failure in the subring 51 and can continue data communication.

Moreover, at the subring 51, as shown in FIG. 4, in the restructure request from the ring connection control circuit 10A, the point Ba between the nodes Na2, Na3 is unblocked, the backup communication path that links the node Na2 and the node Na3, which were blocked, is used, and thereby a new communication path is constructed from the root node Ra to the nodes Na3, Na2, Na1, which enables data communication with each of the nodes connected to the subring 51.

At this time, because output to the transfer processing unit 15 is restricted at the MAC processing unit 12, the restructure request transmitted from the STP processing unit 13 of the ring connection control circuit 10A to the subring 51 via the MAC processing unit 12 is transferred to the subring 52 via the forwardly disposed switch unit 20 and the ring connection control circuit 10B.

Consequently, in each of the nodes Nb1, Nb2, Nb3, Nb4 of the subring 52, the communication path restructuring operation is not performed in response to the restructure request from the subring 51, and this restructuring operation does not temporarily hinder data communication to and from the nodes Nb1, Nb2, Nb3, Nb4 connected to the subring 52. Accordingly, even if a failure occurs in the subring 51, stable data communication can continue in the subring 52.

Thus, in the present embodiment, if either of the MAC processing units 11, 12 in one of the ring connection control circuits 10 receives a MAC frame that includes control information for the redundancy control process related to one of the subrings 50 from that subring 50, then output of the relevant MAC frame to the transfer processing unit 15 is restricted and the relevant MAC frame is output to the STP processing unit 13; therefore, it is possible to prevent the redundancy control process performed at that subring 50 from affecting other subrings that are connected via the switch unit 20. Consequently, even if a failure occurs at an arbitrary subring, data communication can be maintained at normal subrings In addition, in the present embodiment, the ring switching hub 1 is configured by using a plurality of such ring connection control circuits 10 and connecting them such that their communication is relayed by the switch unit 20; therefore, a ring Ethernet system can be constructed using a plurality of subrings 50 that perform separate redundancy control processes independent of one another, which improves the availability of Ethernet networks. In addition, the number of rings is not limited, and a large scale ring Ethernet network can be constructed extremely easily.

In addition, in the present embodiment, providing the general port Px for non-ring connection to the switch unit 20 of the ring switching hub 1 makes it possible to connect commercially available Ethernet connectible devices such as personal computers and servers, which provides flexibility when constructing an Ethernet network.

Figure 5:
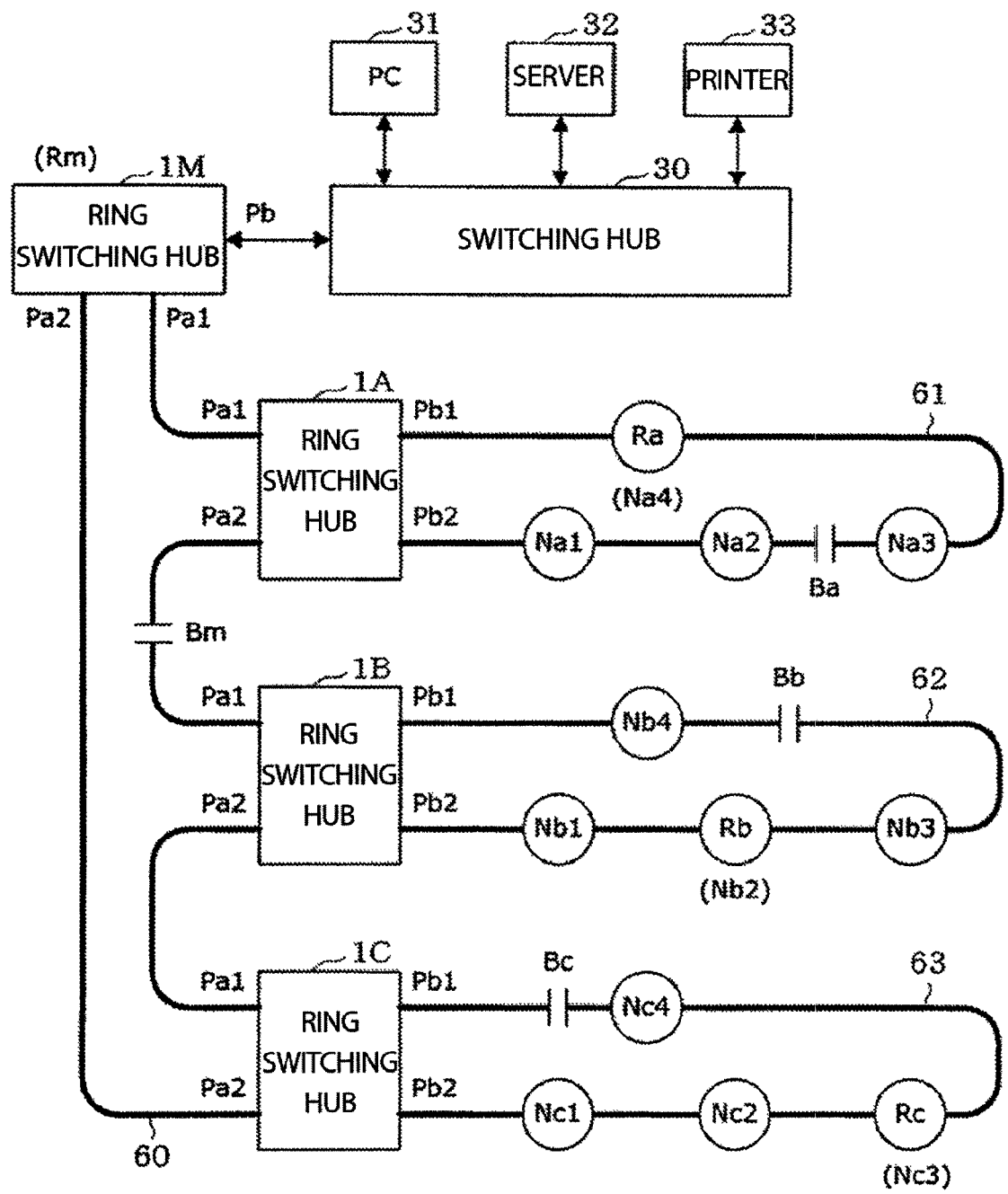
FIG. 5 is an explanatory diagram that shows the configuration of a ring Ethernet system according to another embodiment of the present invention.

Next, the ring Ethernet system according to a another embodiment of the present invention will be explained, referencing FIG. 5. FIG. 5 is an explanatory diagram that shows the configuration of the ring Ethernet system according to the embodiment of the present invention.

Ring Ethernet System

A ring Ethernet system 100 is provided with a plurality of ring switching hubs 1A, 1B, 1C, which respectively connect to individual subrings 61, 62, 63 wherein a plurality of communication devices are connected in series in a ring, and one main ring 60, which connects these ring switching hubs 1A, 1B, 1C in a ring. These ring switching hubs 1A, 1B, 1C each comprise the ring switching hub 1 shown in FIG. 1, which was explained above.

One end of the subring 61 is connected to the port Pb1 (P1) of the ring switching hub 1A, and the other end of the subring 61 is connected to the port Pb2 (P2) of the ring switching hub 1A.

In addition, one end of the subring 62 is connected to the port Pb1 (P1) of the ring switching hub 1B, and the other end of the subring 62 is connected to the port Pb2 (P2) of the ring switching hub 1B.

In addition, one end of the subring 63 is connected to the port Pb1 (P1) of the ring switching hub 1C, and the other end of the subring 63 is connected to the port Pb2 (P2) of the ring switching hub 1C.

In sequence from the port Pb2 side of the ring switching hub 1A, the nodes Na1, Na2, Na3, Na4 are connected in series in a ring to the subring 61, and the point Ba between the node Na2 and the node Na3 is blocked; moreover, of these nodes Na1, Na2, Na3, Na4, the node Na4 is designated as the root node Ra.

In sequence from the port Pb2 side of the ring switching hub 1B, the nodes Nb1, Nb2, Nb3, Nb4 are connected in series in a ring to the subring 62, and the point Bb between the node Nb3 and the node Nb4 is blocked; moreover, of these nodes Nb1, Nb2, Nb3, Nb4, the node Nb2 is designated as the root node Rb.

In sequence from the port Pb2 side of the ring switching hub 1C, nodes Nc1, Nc2, Nc3, Nc4 are connected in series in a ring to the subring 63, and a point Bc between the node Nc4 and the ring switching hub 1C is blocked; moreover, of these nodes Nc1, Nc2, Nc3, Nc4, the node Nc3 is designated as a root node Rc.

These nodes (i.e., communication devices) may be terminal control devices, such as field controllers, I/O modules, and card readers, or they may be communication gateways for linking with devices based on other communication protocols.

Moreover, each of the ports Pa1, Pa2 of the ring switching hubs 1A, 1B, 1C is connected in series in a ring to the main ring 60, and the ports Pa1, Pa2 of a ring switching hub 1M, which is connected to a general-purpose switching hub 30, is also connected in series in a ring to the main ring 60.

In the main ring 60, the ring switching hub 1M is designated as a root node Rm, and a point Bm between the ring switching hub 1A and the ring switching hub 1B is blocked.

Such a configuration makes it possible to connect the subrings 61, 62, 63, which are respectively connected to the ring switching hubs 1A, 1B, 1C, such that their communication is relayed via the main ring 60. Accordingly, the plurality of the subrings 61, 62, 63, which each perform the redundancy control process separately and independently of one another, can be integrated in a single Ethernet system by the main ring 60, which likewise performs a separate redundancy control process independently, thereby making it possible to provide a data communication environment that possesses high reliability even in a large scale facility, such as a building facility or a plant facility, that spans a large area.

Furthermore, in addition to the configuration of the ring switching hub 1 shown in FIG. 1, which was discussed above, the ring switching hub 1M provides to its switch unit 20 a port Pb for non-ring connection, and via this port Pb it is possible to connect to the switching hub 30.

Accordingly, as shown in FIG. 5, communication devices such as a personal computer 31 (i.e., PC), a server 32, and a printer 33, are connected to the switching hub 30, which makes it possible for these communication devices to monitor and control the communication devices connected to the subrings 61, 62, 63. Accordingly, it is possible to construct in a large scale facility such as a building facility or a plant facility that spans a wide area a monitoring and controlling system that possesses high reliability.

In addition, the present embodiment explained an exemplary case wherein the ring switching hubs 1A, 1B, 1C are connected in series in a ring by the main ring 60; however, instead of using the main ring 60, the ring switching hubs 1A, 1B, 1C may be connected such that their communication is relayed by the switching hub 30.

Thereby, if the ring switching hubs 1A, 1B, 1C are disposed at positions relatively close together, an efficient monitoring and controlling system can be constructed without using the ring switching hub 1M.

Figure 6:
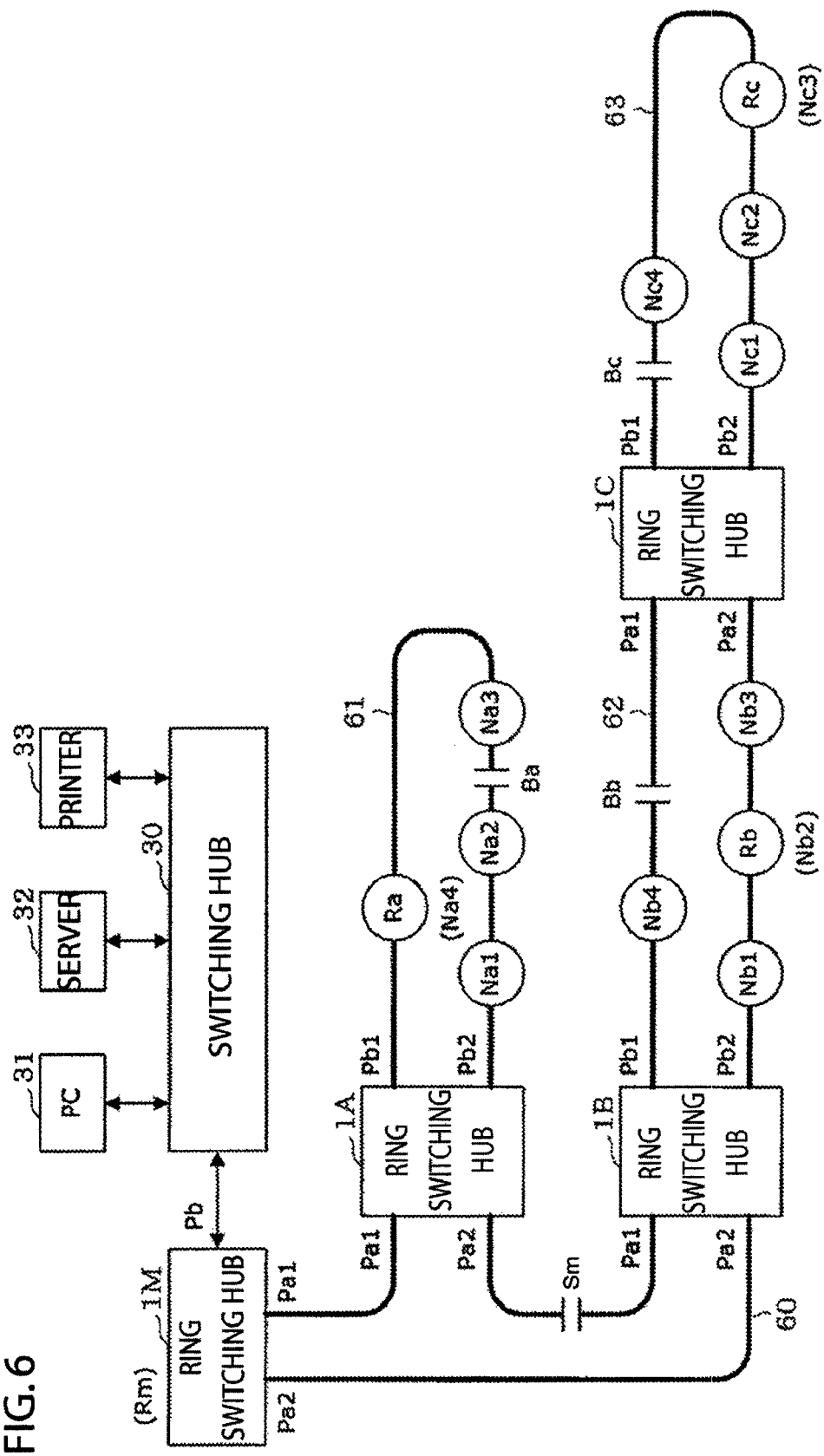
FIG. 6 is an explanatory diagram that shows the configuration of the ring Ethernet system according to a further embodiment of the present invention.

Next, the ring Ethernet system according a further embodiment of the present invention will be explained, referencing FIG. 6. FIG. 6 is an explanatory diagram that shows the configuration of the ring Ethernet system according to the present invention.

The above embodiment explained an exemplary case wherein the ring switching hubs 1A, 1B, 1C are connected in series in a ring by the main ring 60. The present embodiment explains a case wherein, instead of connecting the ring switching hub 1C of the ring Ethernet system according to the above embodiment to the main ring 60, the ring switching hub 1C is cascade connected to the subring 62 of the ring switching hub 1B.

In the ring Ethernet system according to the present embodiment, one end of the subring 61 is connected to the port Pb1 (P1) of the ring switching hub 1A, and the other end of the subring 61 is connected to the port Pb2 (P2) of the ring switching hub 1A.

In addition, one end of the subring 62 is connected to the port Pb1 (P1) of the ring switching hub 1B, and the other end of the subring 62 is connected to the port Pb2 (P2) of the ring switching hub 1B.

In addition, one end of the subring 63 is connected to the port Pb1 (P1) of the ring switching hub 1C, and the other end of the subring 63 is connected to the port Pb2 (P2) of the ring switching hub 1C.

In sequence from the port Pb2 side of the ring switching hub 1A, the nodes Na1, Na2, Na3, Na4 are connected in series in a ring to the subring 61, and the point Ba between the node Na2 and the node Na3 is blocked; moreover, of these the node Na4 is designated as the root node Ra.

In sequence from the port Pb2 side of the ring switching hub 1B, the nodes Nb1, Nb2, Nb3, the port Pa2 (P2), and the port Pa1 (P1) of the ring switching hub 1C, and the node Nb4 are connected in series in a ring to the subring 62, and the point Bb between the port Pa1 of the ring switching hub 1C and the node Nb4 is blocked; moreover, of these nodes the node Nb2 is designated as the root node Rb.

In sequence from the port Pb2 side of the ring switching hub 1C, nodes Nc1, Nc2, Nc3, Nc4 are connected in series in a ring to the subring 63, and a point Bc between the node Nc4 and the ring switching hub 1C is blocked; moreover, of these nodes the node Nc3 is designated as a root node Rc.

These nodes (i.e., communication devices) may be terminal control devices, such as field controllers, I/O modules, and card readers, or they may be communication gateways for linking with devices based on other communication protocols.

Moreover, each of the ports Pa1, Pa2 of the ring switching hubs 1A, 1B is connected in series in a ring to the main ring 60, and the ports Pa1, Pa2 of a ring switching hub 1M, which is connected to a general-purpose switching hub 30, is also connected in series in a ring to the main ring 60.

In the main ring 60, the ring switching hub 1M is designated as a root node Rm, and a point Bm between the ring switching hub 1A and the ring switching hub 1B is blocked.

Thereby, it is no longer necessary to connect the main ring 60 to all of the ring switching hubs 1A, 1B, 1C, and only the ring switching hubs 1A, 1B, which are installed at positions that are relatively close together, should be connected by the main ring 60.

Accordingly, even in large scale facilities, such as building facilities and plant facilities, that span a large area, it is possible to efficiently and flexibly construct both a monitoring and controlling system and a data communication environment that possess high reliability in accordance with the installation position of the ring switching hub 1.

What is claimed is:

1. A ring connection control circuit that connects a subring, wherein a plurality of communication devices is connected in series in ring form, and a switching hub, comprising:
 a first MAC processing unit, which is connected to one end of the subring and sends and receives MAC frames to and from the communication devices;
 a second MAC processing unit, which is connected to the other end of the subring and sends and receives the MAC frames to and from the communication devices; an STP processing unit, which is connected to the first and second MAC processing units and performs a redundancy control process on the subring based on a spanning tree protocol;
 a third MAC processing unit, which is connected to the switching hub and sends and receives the MAC frames; and
 a transfer processing unit, which transfers the MAC frames received by the first MAC processing unit, the second MAC processing unit, and the third MAC processing unit to any one processing unit from the group consisting of the first MAC processing unit, the second MAC processing unit, and the third MAC processing unit based on destination information that is included in the MAC frames;
 wherein, if the first and second MAC processing units receive from the subring a MAC frame that includes control information for the redundancy control process related to that subring, then output of the relevant MAC frame to the transfer processing unit is restricted and the MAC frame is output to the STP processing unit.

2. A ring switching hub, comprising:
 a plurality of ring connection control circuits, each of which connects a subring, in which a plurality of communication devices are connected to each other in series in ring form, with the ring switching hub, each of the ring connection control circuits including:
  a first MAC processing unit, which is connected to one end of the subring and sends and receives MAC frames to and from the communication devices;
  a second MAC processing unit, which is connected to the other end of the subring and sends and receives the MAC frames to and from the communication devices; an STP processing unit, which is connected to the first and second MAC processing units and performs a redundancy control process on the subring based on a spanning tree protocol;
  a third MAC processing unit, which is connected to the switching hub and sends and receives the MAC frames; and
  a transfer processing unit, which transfers the MAC frames received by the first MAC processing unit, the second MAC processing unit, and the third MAC processing unit to any one processing unit from the group consisting of the first MAC processing unit, the second MAC processing unit, and the third MAC processing unit based on destination information that is included in the MAC frames,
  wherein, if the first and second MAC processing units receive from the subring a MAC frame that includes control information for the redundancy control process related to that subring, then output of the relevant MAC frame to the transfer processing unit is restricted and the MAC frame is output to the STP processing unit; and
 a switch unit, which connects the ring connection control circuits and a third MAC processing unit and transfers MAC frames received by these ring connection control circuits from their respective subrings to one of the ring connection control circuits based on destination information that is included in the relevant MAC frame.

3. A ring Ethernet system that uses a plurality of subrings, each of which comprises a plurality of communication devices connected in series in ring form, to implement Ethernet communication between the communication devices, comprising:
 a plurality of ring switching hubs, each of which including:
  a plurality of ring connection control circuits, each of which connects a subring, in which the plurality of communication devices are connected to each other in series in ring form, with the ring switching hub, each of the ring connection control circuits including:
   a first MAC processing unit, which is connected to one end of the subring and sends and receives MAC frames to and from the communication devices;
   a second MAC processing unit, which is connected to the other end of the subring and sends and receives the MAC frames to and from the communication devices; an STP processing unit, which is connected to the first and second MAC processing units and performs a redundancy control process on the subring based on a spanning tree protocol;
   a third MAC processing unit, which is connected to the switching hub and sends and receives the MAC frames; and
   a transfer processing unit, which transfers the MAC frames received by the first MAC processing unit, the second MAC processing unit, and the third MAC processing unit to any one processing unit from the group consisting of the first MAC processing unit, the second MAC processing unit, and the third MAC processing unit based on destination information that is included in the MAC frames,
   wherein, if the first and second MAC processing units receive from the subring a MAC frame that includes control information for the redundancy control process related to that subring, then output of the relevant MAC frame to the transfer processing unit is restricted and the MAC frame is output to the STP processing unit; and
  a switch unit, which connects the ring connection control circuits and a third MAC processing unit and transfers MAC frames received by these ring connection control circuits from their respective subrings to one of the ring connection control circuits based on destination information that is included in the relevant MAC frame; and
 one main ring that connects these ring switching hubs in ring form.

4. A ring Ethernet system that uses a plurality of subrings, each of which comprises a plurality of communication devices connected in ring form, to implement Ethernet communication between the communication devices, comprising:
 a plurality of ring switching hubs, each of which including:
  a plurality of ring connection control circuits, each of which connects a subring, in which the plurality of communication devices are connected to each other in ring form, with the ring switching hub, each of the ring connection control circuits including:
   a first MAC processing unit, which is connected to one end of the subring and sends and receives MAC frames to and from the communication devices;

a second MAC processing unit, which is connected to the other end of the subring and sends and receives the MAC frames to and from the communication devices; an STP processing unit, which is connected to the first and second MAC processing units and performs a redundancy control process on the subring based on a spanning tree protocol;

a third MAC processing unit, which is connected to the switching hub and sends and receives the MAC frames; and a transfer processing unit, which transfers the MAC frames received by the first MAC processing unit, the second MAC processing unit, and the third MAC processing unit to any one processing unit from the group consisting of the first MAC processing unit, the second MAC processing unit, and the third MAC processing unit based on destination information that is included in the MAC frames, wherein, if the first and second MAC processing units receive from the subring a MAC frame that includes control information for the redundancy control process related to that subring, then output of the relevant MAC frame to the transfer processing unit is restricted and the MAC frame is output to the STP processing unit; and a switch unit, which connects the ring connection control circuits and a third MAC processing unit and transfers MAC frames received by these ring connection control circuits from their respective subrings to one of the ring connection control circuits based on destination information that is included in the relevant MAC frame; and a switching hub, which is connected to each of these ring switching hubs and exchanges MAC frames received by these ring switching hubs from their respective subrings.

5. A ring connection controlling method that connects a subring, wherein a plurality of communication devices is connected in ring form, and a switching hub, comprising:

a first MAC processing step, wherein a first MAC processing unit sends and receives MAC frames to and from the communication devices via one end of the subring;

a second MAC processing step, wherein a second MAC processing unit sends and receives the MAC frames to and from the communication devices via the other end of the subring;

an STP processing step, wherein an STP processing unit is connected to the first and second MAC processing units and performs a redundancy control process on the subring based on a spanning tree protocol;

a third MAC processing step, wherein a third MAC processing unit sends and receives the MAC frames to and from the switching hub; and a transfer processing step, wherein a transfer processing unit exchanges the MAC frames from the subrings received by the first and second MAC processing units and the MAC frames from the subrings received by the third MAC processing unit;

wherein, if the first and second MAC processing steps receive from the subring a MAC frame that includes control information for the redundancy control process related to that subring, then output of the MAC frame to the transfer processing unit is restricted and the MAC frame is output to the STP processing unit.

* * * * *